United States Patent [19]

Wegner et al.

[11] Patent Number: 4,828,917

[45] Date of Patent: May 9, 1989

[54] LAYER OF METALLOMACROCYCLIC POLYMER ON SUBSTRATE

[75] Inventors: Gerhard Wegner, Mainz-Drais; Ernst Orthmann, Mainz-Bretzenheim, both of Fed. Rep. of Germany

[73] Assignee: BASF Aktiengesellschaft, Ludwigshafen, Fed. Rep. of Germany

[21] Appl. No.: 47,160

[22] Filed: May 8, 1987

[30] Foreign Application Priority Data

May 10, 1986 [DE] Fed. Rep. of Germany ... 36-15832

[51] Int. Cl.⁴ .......................... B05D 1/18; G03G 5/06; B32B 9/06
[52] U.S. Cl. .............................. 428/333; 428/411.1; 428/450; 428/697; 428/699; 428/457; 428/432; 428/446; 430/31; 430/57; 427/430.1; 427/435; 427/439; 427/372.2
[58] Field of Search .................... 428/450, 411.1, 697, 428/699, 333

[56] References Cited

U.S. PATENT DOCUMENTS 4,592,980 6/1986 Tomida et al. .

FOREIGN PATENT DOCUMENTS 0022618 1/1981 European Pat. Off. .
0077577 4/1983 European Pat. Off. .
3242712 5/1984 Fed. Rep. of Germany .

OTHER PUBLICATIONS

Journal of Polymer Science, Polymer Chemistry Edition, vol. 17, 1631–1644, (1979).
J. Am. Chem. Soc., 106, pp. 4706–4711, (1984).
Nature, vol. 313, pp. 382–384, (1985).
Inorganic Chemistry, vol. 2, pp. 1064–1065, (1963).
J. Am. Soc., vol. 91, pp. 5210–5214, (1969).
Adv. Pol. Sci., vol. 50, (1983), pp. 83–134.
J. Am. Chem. Soc., 1983, 105, 1539–1550.

*Primary Examiner*—P. C. Ives
*Attorney, Agent, or Firm*—Keil & Weinkauf

[57] ABSTRACT

A layer element comprises a base having a hydrophobic surface and, applied on this, one or more solid, thin, ordered layers of defined uniform and regular structure, in particular monolayers or multilayers, having a uniform orientation of the layer-forming molecules in one direction. The said layers are formed from a metallomacrocyclic polymer which is fusible and/or soluble in an organic, water-immiscible solvent and is of the general formula $[M(Pcyc)O]_n$, where M is Si, Ge or Sn, (Pcyc) is a complex-forming centrosymmetric polycyclic ring system, in particular a phthalocyanine ring system having hydrophobic substituents, and n is the mean degree of polymerization and is equal to or greater than 3. The novel layer elements can advantageously be produced by the Langmuir-Blodgett technique, in which a solid-like monolayer produced on a water surface from the metallomacrocyclic polymers is transferred to a substrate having a hydrophobic surface by immersion and withdrawal of the said substrate. The layer elements according to the invention can be used, for example, as optical filters, e.g. grey filters, interference filters or polarization filters, in electrochemistry and the electrical industry, for example as electrodes, sensors, catalysts etc., as photosensitive elements for electrophotography, and for many other applications.

7 Claims, No Drawings

LAYER OF METALLOMACROCYCLIC POLYMER ON SUBSTRATE

The present invention relates to layer elements having a base and, applied on this, one or more thin layers in which the molecules are oriented and uniformly distributed on the surface of the base to form an arrangement of high density, in particular a monomolecular layer structure or multimolecular layer structure, which have a wide variety of applications. The present invention furthermore relates to a process for the production of these layer elements.

The production of thin solid layers having a monomolecular or multimolecular layer structure (frequently also abbreviated to monolayers or multilayers) on a base or substrate is known. A conventional method for preparing them is the Langmuir-Blodgett technique, in which a high density monolayer which is formed at the phase boundary between water and air and in which the layer-forming molecules have an oriented arrangement is transferred to a substrate in an ordered state by dipping in this substrate or pulling it out. This gives, on the substrate serving as the base, a defined thin solid monolayer in which the layer-forming molecules are present in an ordered arrangement and uniformly distributed over the substrate surface, with formation of a high density arrangement. By repeating this process several times, any number of monolayers can be applied one on top of the other on the substrate, with the result that a multilayer film or coating is obtained on the substrate surface.

To date, thin solid monolayers or multilayers have been produced using water-insoluble amphiphilic compounds having a hydrophilic head group and a hydrophobic tail, which is generally long-chain. At the phase boundary between water and air, these amphiphilic molecules form a monolayer in which, when the surface area is reduced, the molecules become oriented so that they are parallel to one another and at right angles to the surface of the water, the hydrophilic head group being in the water. The thickness of the monolayers can be varied via the length of the side chains of the amphiphilic molecules. As a rule, other molecules cannot be used since they tend to aggregate or crystallize on the water surface and the monomolecular nature of the surface layer is lost.

Amphiphilic compounds which are particularly interesting for the production of monolayers and multilayers include amphiphilic diacetylenes (cf. inter alia J. Pol. Sci., Polymer Chem. Ed. 17 (1979), 1631–1644, EP-A-No. 22 618 and EP-A-No. 77 577). They permit the production of well defined polymeric multilayers and can advantageously be used for the production of highly sensitive and high-resolution thin photoresist layers. DE-A-No. 34 44 354 describes photosensitive recording materials for electrophotography which, in order to achieve high sensitivity and resolution, contain a photosensitive monolayer or multilayer film of amphiphilic compounds. In addition to a hydrophilic group, for example a carboxyl group, and a hydrophobic group, for example a long-chain alkyl group, the film-forming amphiphilic molecules can possess a photosensitive group, e.g. a porphyrin, anthracene or phenanthrene ring or a diazo, polyvinyl or polyacetylene group. According to the Examples of DE-A-No. 34 44 354, polyvinylcarbazole derivatives and copper phthalocyanine are among the substances used for the production of the photosensitive monolayer or multilayer films. Particularly very recently, the wide range of possible uses of phthalocyanine compounds has made monolayers of soluble metallophthalocyanines the subject of various investigations (cf. inter alia J. Am. Chem. Soc. 106 (1984), 4706–4711 and Nature, 313 (1985), 382–384).

The known Langmuir-Blodgett films, i.e. monolayers or multilayers, have a pronounced domain structure, i.e. they are composed of a large number of small domains. Although, as a rule, the individual domains have an oriented and ordered molecular arrangement, in the entire monolayer or multilayer the individual domains are arranged in a completely irregular and unoriented manner with respect to one another. Thus, it is true that solid thin ordered layers of well defined thickness and high uniformity can be produced on a substrate by means of these known LB films, but, owing to domain formation, these solid thin layers do not have a homogeneous, uniform macroscopic structure over the entire layer. To date, many desirable properties of solid thin layers, which are associated with uniform orientation of the molecules in the entire layer, e.g. anisotropy, have been achieved in such solid thin layers only inadequately and with difficulty, if at all.

It is an object of the present invention to provide novel layer elements which possess, on a substrate as the base, one or more solid thin, in particular monomolecular or multimolecular layers of defined uniform and regular structure and uniform orientation of the layer-forming molecules over the entire solid-thin layer and, because of their structure, have a wide variety of advantageous and reproducible properties and hence a wide range of applications.

We have found that this object is achieved and that surprisingly, layer elements of this type are obtained if, in order to produce the solid thin layers having a defined structure, metallomacrocyclic polymers are applied in a suitable manner to a substrate having a hydrophobic surface.

The present invention accordingly relates to a layer element which possesses a base having a hydrophobic surface and, applied on the said base, one or more solid, thin, ordered layers having a defined uniform and regular structure with uniform orientation of the layer-forming molecules in one direction and consisting of a metallomacrocyclic polymer which is fusible and/or soluble in an organic water-immiscible solvent and is of the general formula $[M(Pcyc)O]_n$, where M is Si, Ge or Sn, Pcyc is a complex-forming centrosymmetric polycyclic ring system, in particular a phthalocyanine ring system having a hydrophobic substituent, and n is the mean degree of polymerization and is equal to or greater than 3.

The present invention furthermore relates to a process for the production of layer elements of the above type by applying one or more solid, thin layers or defined structure to a substrate as a base, wherein a monomolecular solid-like layer produced on a water surface and consisting of a metallomacrocyclic polymer which is soluble in an organic, water-immiscible solvent and is of the general formula $[M(Pcyc)O]_n$, where M is Si, Ge or Sn, Pcyc is a complex-forming centrosymmetric polycyclic ring system and n is the mean degree of polymerization and is equal to or greater than 3, is transferred from the water surface to a substrate having a hydrophobic surface by dipping the said substrate in and withdrawing it and, if necessary, repeating this process several times.

The present invention furthermore relates to the various embodiments of the layer elements and of the process for their production, as described in detail below.

We have found, surprisingly, that the soluble and/or fusible metallomacrocyclic polymers used according to the invention can be employed to produce, on a hydrophobic substrate surface, well defined solid thin monolayers or multilayers which do not exhibit domain formation but possess, over the entire layer surface an thickness, a uniform and regular ordered structure in which the metallomacrocyclic polymer molecules forming the solid thin layers are uniformly oriented in one direction. The solid thin layers of the novel layer elements consisting of the metallomacrocyclic polymers may therefore also be referred to and defined as single domain films or single domain layers which are in the form of a sort of frozen liquid crystal structure and in which the complex-forming centrosymmetric polycyclic ring systems of the metallomacrocyclic polymers are transverse to the plane of the base or substrate. Regardless of the number of thin monolayers or multilayers arranged one on top of the other on a base, the layer elements according to the invention are optically anisotropic as well as thermally very stable and possess advantageous electrical and optoelectrical properties, so that they are very useful for a very wide variety of applications. The fact that it was possible to produce monolayers or multilayers of well defined uniform and regular structure using the soluble and/or fusible metallomacrocyclic polymers employed according to the invention was all the more surprising since the said polymers which, according to the invention, form the solid thin monolayers or multilayers are not amphiphilic compounds, as are usually employed in the Langmuir-Blodgett technique (LB technique) for the production of monolayers or multilayers.

Suitable bases for the novel layer elements, on which the solid, thin, ordered layers of well defined structure and consisting of the metallomacrocyclic polymers are applied, as any solid, preferably dimensionally stable substrates composed of a very wide variety of materials. The substrates used as bases may be, for example, transparent or opaque to light, electrically conductive or insulating. All that is important is that the substrate surface to which the solid thin layer of the metallomacrocyclic polymers is applied is hydrophobic. This can be achieved by ensuring that the substrate consists of a hydrophobic material or by rendering the surface of the substrate hydrophobic in a conventional manner by a suitable pretreatment before applying the solid thin layer of the metallomacrocyclic polymers. The hydrophobic substrate surface to be coated should be very clean so that the formation of a solid, thin, ordered layer, in particular a monolayer or multilayer, is not impeded. For example, the presence of surfactants on the substrate surface to be coated may adversely affect the formation of a good monolayer or multilayer. For example, the substrates serving as bases can first be provided with an intermediate layer on their surface to be coated, prior to application of the solid thin layers of the metallomacrocyclic polymers, for example in order to achieve good adhesion between the solid, thin layer of the metallomacrocyclic polymers and the substrate. Furthermore, the substrate may be formed from different materials in a plurality of strata, provided that the outer surface to which the said layer is to be applied is hydrophobic.

Examples of suitable materials for the substrates used as bases are metals, e.g. platinum, nickel, palladium, aluminum, chromium, niobium, tantalum, titanium, steel and the like. Other suitable materials for the substrates included plastics, such as polyesters, e.g. polyethylene terephthalate, polybutylene terephthalate, polyvinyl chloride, polyvinylidene chloride, polytetrafluoroethylene etc. Examples of further suitable materials for the substrates are silicon, glass, silica, ceramic materials and cellulose products, e.g. papers. The surface of glass substrates can, if required, be rendered hydrophobic in a conventional manner, for example by reaction with alkylsilanes. The choice of substrate materials depends, inter alia, mainly on the intended use of the novel layer elements. For optical elements, transparent substrates which transmit light are generally used as bases. If the novel layer elements are used, for example, in the electrical industry or in electrochemical processes, particularly useful substrates are electrically conductive materials, such as metals, or materials having electrically conductive, in particular metallic, surface layers, for example metallized plastic films. For antistatic treatment, the solid thin layers of the metallomacrocyclic polymers are applied. to the articles to be provided with an antistatic treatment, for example plastic components, as substrates.

The substrates used as bases for the novel layer elements can have any form, depending on the intended use. For example, they may be film-like, sheet-like, panel-like, tape-like, disk-like or cylindrical or may be selected from any other forms. In general, the bases are flat, even substrates, such as films, sheets, panels, disks, tapes, metal sheets and the like. The substrate surface to be coated is preferably smooth, as is usual for the production of thin ordered layers having a well defined structure, in particular monolayers or multilayers. In the case of the flat even substrates, such as films, sheets, tapes etc., the novel solid, thin, ordered layers having a well defined structure and consisting of metallomacrocyclic polymers may be applied on one or both surfaces of the substrate. Of course, where the metallomacrocyclic polymer is applied only to one of the surfaces of the substrate, only this surface of the substrate need be hydrophobic.

The layer elements according to the invention contain, applied to the substrate serving as the base, one or more solid, thin, ordered layers having a well defined structure, in particular a monolayer or multilayer structure, and consisting of a metallomacrocyclic polymer of the general formula [M(Pcyc)O]n, where M is Si, Ge or Sn, (Pcyc) is a complex-forming centrosymmetric polycyclic ring system and n is the mean degree of polymerization and is equal to or greater than 3. These metallomacrocyclic polymers used according to the invention are polysiloxanes, polygermyloxanes or polystannyloxanes, i.e. polymers in which the metal atoms covalently bonded to one another via oxygen atoms form the polymer chain, the metal atoms (Si, Ge or Sn) of the polymer chain each being surrounded by a complex-forming, centrosymmetric, polycyclic ring system whose central atom they form. Particularly suitable polycyclic ring systems are those capable of forming planar centrosymmetric metal complexes or metal chelates, especially the polycycles which form planar centrosymmetric $N_4$ chelates. Examples of such complex-forming, centrosymmetric ring systems are the porphyrin, corrin, hemyporphyrazine and in particular phthalocyanine ring systems.

The metallomacrocyclic polymers used according to the invention for forming the solid thin ordered layers of defined structure should be fusible and/or soluble in organic, water-immiscible solvents. Preferably, the said polymers are soluble in organic, water-immiscible solvents which are readily vaporizable, e.g. chloroform and the like. To achieve the desired solubility and/or fusibility of the metallomacrocyclic polymers, it is generally necessary for the polycyclic ring systems of the metallomacrocyclic polymers to carry outer substituents, since metallomacrocyclic polymers of the type under discussion whose polycyclic ring system is unsubstituted, for example the known unsubstituted phthalocyaninatopolysiloxanes, are, as a rule, insoluble and infusible. Outer substituents are those substituents which are arranged at the periphery of the polycyclic ring system; they may therefore also be referred to as oeripheral substituents. Suitable outer substituents of the polycyclic ring systems are any organic radicals which have a hydrophobic effect, i.e. radicals without hydrophilic terminal groups, provided that they render the metallomacrocyclic polymers soluble and/or fusible or increase their solubility and/or fusibility. The outer substituents of the polycyclic ring systems may be, for example, aliphatic radicals, for example long-chain alkyl or long-chain alkoxy groups, aromatic radicals, for example aryl groups, or mixed aliphatic-aromatic radicals, and may furthermore contain hetero atoms, for example ether bonds, or groups containing hetero atoms, for example carbonyl or sulfonamide groups, provided that these do not have an adverse effect on the hydrophobic action of these outer substituents. The organic radicals for the outer substituents may be linear or branched and may furthermore be, for example, chiral radicals or groups. The metallomacrocyclic polymers used according to the invention are hydrophobic and insoluble in water.

The metallomacrocyclic polymers used according to the invention for producing the solid thin ordered layers of defined structure are illustrated in detail below using, as a typical example, the phthalocyaninatopolymetalloxanes which are fusible and/or soluble in an organic, water-immiscible solvent and are particularly advantageous because of the varied and outstanding properties of the novel layer elements produced with them. These phthalocyaninatopolymetalloxanes are of the general formula [M(Pc)0]n, where M is Si, Ge or Sn, (Pc) is a phthalocyanine ring system substituted by a hydrophobic radical so that the phthalocyaninatopolymetalloxanes are fusible and/or soluble in organic, water-immiscible solvents, and n is the mean degree of polymerization and is equal to or greater than 3. The phenyl rings of the phthalocyanine ring system may each carry one or more, in particular 1 or 2, substituents, which should have nonpolar, hydrophobic terminal groups. The individual phenyl rings of the phthalocyanine ring system generally carry the same substituents. Suitable substituents are the organic radicals discussed above, which may contain hetero atoms or groups containing hetero atoms. Preferably, each phenyl ring of the phthalocyanine ring system carries one or more substituents having a terminal, long-chain alkyl radical, in particular of 6 to 30 carbon atoms. In the phthalocyaninatopolymetalloxanes used according to the invention, the metal atoms from the group consisting of Si, Ge and Sn form complex bonds as the central atom in the phthalocyanine ring system carrying hydrophobic substituents, the Si, Ge or Sn atoms being covalently bonded to one another via one oxygen atom in each case with formation of a polysiloxane, polygermyloxane or polystannyloxane chain.

Phthalocyaninatopolymetalloxanes which are preferred for the production of the solid, thin, ordered layers of well defined structure in the novel layer elements are composed of repeating units of the general formula (I) below

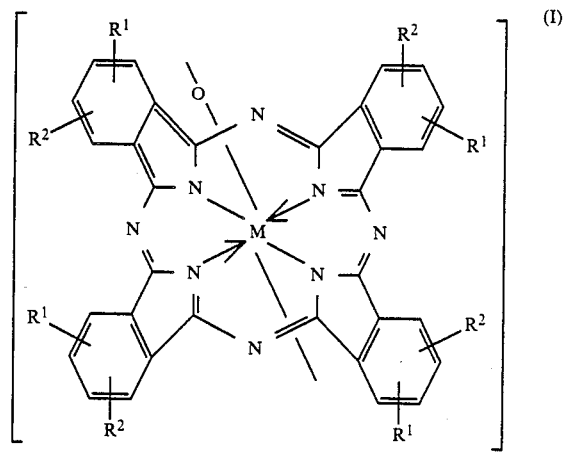

In the general formula (I), M is a silicon, germanium or tin atom and $R^1$ and $R^2$ are each a substituent of the type described above, for example alkyl, alkoxy, alkoxyalkyl, aryl, alkylaryl, aralkyl or sulfonamidoalkyl, or $R^1$ and $R^2$ together may furthermore be a radical of a fused aromatic ring system, one of the radicals $R^1$ or $R^2$ furthermore being hydrogen. Typical examples of $R^1$ in the general formula (I) are hydrogen, alkyl, e.g. methyl, and alkoxy, e.g. —OCH$_3$. Typical examples of $R^2$ in the general formula (I) are long-chain alkyl and alkoxy groups, in particular those of 6 to 30 carbon atoms, e.g. —OC$_8$H$_{17}$ or —OC$_{12}$H$_{25}$, alkoxyalkylene radicals having a terminal longchain alkyl group of, preferably, 6 to 30 carbon atoms, e.g. —CH$_2$—O—C$_8$H$_{17}$, and the —SO$_2$NHR group where R is a longchain alkyl radical, in particular of 6 to 30 carbon atoms.

The mean degree of polymerization of the metallomacrocyclic polymers used according to the invention, expressed by the number n in the above general formula [M(Pcyc)0]$_n$ of the metallomacrocyclic polymers or the general formula [M(Pc)0]$_n$ of the advantageous phthalocyaninatopolymetalloxanes, should be not less than 3 but otherwise is not restricted and can vary within wide limits. For example, degrees of polymerization up to n = 100 are quite possible. The upper limit of the degree of polymerization is often determined, inter alia, by the method of preparation of the polymers and/or the type of substituents in the complex-forming, centrosymmetric polycyclic ring system. In practice, we have found that the advantageous and preferred metallomacrocyclic polymers frequently have a mean degree of polymerization of about 4–20.

The soluble and/or fusible metallomacrocyclic polymers of the type under discussion can be orepared in a conventional manner familiar to the skilled worker, by polycondensation of the corresponding monomeric dihydroxy compounds [M(Pcyc)(OH)$_2$], where M and (Pcyc) have the meanings stated above in connection with the polymers. The synthesis of metallomacrocyclic polymers whose polycyclic ring system is of course unsubstituted and the polymers are therefore insoluble and infusible, is described in, for example, Inorganic Chemistry, 2 (1963), 1064–1065, J. Amer. Chem. Soc. 91 (1969), 5210–5214, Adv. Pol. Sci. 50 (1983), 83 et seq and J. Amer. Chem. Soc. 105 (1983), 1539–1550. The corresponding soluble and/or fusible metallomacrocyclic polymers can be prepared in a similar manner; in order to introduce the substituents which impart solubility and/or fusibility, either appropriate substituted starting compounds are used or the unsubstituted polymers are first prepared and the substituents are then introduced into the polycyclic ring systems of the polymers by polymer-analogous reaction. Because the polymers are prepared by polycondensation of the corresponding monomeric dihydroxy compounds, the metallomacrocyclic polymers used according to the invention generally contain terminal hydroxyl groups. However, it is of course also possible to use metallomacrocyclic polymers of the type under discussion which have other terminal groups, as obtained, for example, if the terminal hydroxyl groups are blocked by reaction with other compounds.

The solid, thin, ordered layers of defined, uniform and regular structure which are present in the novel layer elements may be formed by one or more of the metallomacrocyclic polymers. In addition to the metallomacrocyclic polymers, the said layers may also contain other components, in particular the monomeric metallomacrocyclic compounds from which the polymers are derived. Thus, it has been found that novel layer elements whose solid, thin, ordered layers are formed from a mixture of the fusible and/or soluble metallomacrocyclic polymers of the general formula [M(Pcyc)O]$_n$ and the fusible and/or soluble monomeric metallomacrocyclic compounds from which these polymers are derived, of the general formula [M(Pcyc)X$_2$], where M, (Pcyc) and n have the above meanings and X is a terminal group bonded to M, in particular hydroxyl, are just as advantageous and, in particular, have optically anisotropic properties. This was completely unexpected since in fact solid, thin, ordered layers which are formed only from the said monomers have a pronounced domain structure and are optically isotropic.

The monomers from which the metallomacrocyclic polymers are derived, and which likewise should be fusible and/or soluble in an organic, water-immiscible and preferably readily vaporizable solvent are present in the polymer/monomer mixtures for the solid, thin, ordered layers of the novel layer elements in an amount which can vary within wide limits and is in general about 1–80% by weight, based on the polymer/monomer mixture. Novel layer elements having solid, thin, ordered layers of mixtures of the metallomacrocyclic polymers under discussion and a high content of the monomers from which these polymers are derived surprisingly still exhibit very pronounced optical anisotropy. Very advantageous novel layer elements are those whose solid, thin, ordered layers consist of a mixture of phthalocyaninatopolymetalloxanes of the general formula [M(Pc)O]$_n$, which are fusible and/or soluble in organic, water-immiscible solvents, and the monomeric compounds of the general formula [M(Pc)X$_2$] from which these polymers are derived; in these general formulae, as stated above, M is Si, Ge or Sn, (Pc) is a phthalocyanine ring system which carries hydrophobic substituents to impart fusibility and/or solubility to the compounds, n is the mean degree of polymerization and is equal to or greater than 3 and X is any terminal group, in particular hydroxyl. Preferably, the said layers of the novel layer elements, which are formed from a polymer/monomer mixture of the stated type, contain the monomers in an amount of about 5–50% by weight, based on the polymer/monomer mixture. The properties of the said layers and hence of the novel layer elements, e.g. optical anisotropy, absorption curves and absorption maxima etc., can be varied and set via the amount of monomers in the said layers of the metallomacrocyclic polymers under discussion.

The solid, thin, ordered layers formed from the metallomacrocyclic polymers and present in the novel layer elements do not exhibit any domain formation like the known monolayers or multilayers, but have a well defined, uniform and regular structure over the entire thin, ordered layer or layers. They thus form the single-domain film on the substrate surface. In the said layers of the novel layer elements, the metallomacrocyclic polymer molecules forming the thin, ordered layers are oriented uniformly in one direction over the entire layer and are arranged so that the planes of the rings of the polycyclic ring systems of the metallomacrocyclic polymers are transverse, i.e. at right angles or at least substantially at right angles, to the plane of the substrate surface serving as a base. Accordingly, the polysiloxane, polygermyloxane or polystannyloxane chains of the metallomacrocyclic polymers in the said layers of the novel layer elements are parallel or at least substantially parallel to one another over the entire solid, thin, ordered layer and are in a plane, or in planes, parallel or at least substantially parallel to the plane of the substrate surface serving as a base. In the said layers of the novel layer elements, which are formed from mixtures of the metallomacrocyclic polymers with the metallomacrocyclic monomers from which these polymers are derived, the plane of the rings of the polycyclic ring system of the metallomacrocyclic polymers are parallel to the planes of the rings of the polycyclic ring systems of the metallomacrocyclic polymers and therefore likewise at right angles or at least substantially at right angles to the plane of the substrate surface. It is therefore to be assumed that the monomers are ordered by the polymer stack and are oriented on the substrate surface in the same way as the polymers. The uniform and regular layer structure having the uniform molecular orientation in one direction of the solid, thin, ordered layers of the metallomacrocyclic polymers in the novel layer elements can be demonstrated by the conventional analytical methods usually employed for such layers, in particular X-ray diffraction and electron diffraction measurements, and is confirmed by the characteristic properties of the novel layer elements, in particular by their uniform optical absorption, bifringence and dichroism.

The said layers of the novel layer elements of the metallomacrocyclic polymers possess, in particular and advantageously, a monolayer or multilayer structure. The layers having a monolayer structure are monomolecular layers or monomolecular films, i.e. ordered layers of films consisting of a molecular stratum in which the molecules forming the layer or film are oriented and uniformly distributed on the substrate surface, with formation of a high-density arrangement, as obtained, for example, by the Langmuir-Blodgett method (referred to below as the LB method). The solid, thin, ordered layers of the novel layer elements, having a monolayer structure, can be formed from one or more different types of the metallomacrocyclic polymers under discussion, or from mixtures of these with the corresponding monomers. The solid, thin, ordered layers having a multilayer structure are multistratum layers consisting of monolayers or monomolecular films, i.e. ordered layers in which two or more monomolecular films are arranged one on top of the other on the base. In the solid, thin, ordered layers having a multilayer structure, the individual monomolecular films can be produced from the same or different metallomacrocyclic polymers or the same or different mixtures of these polymers and monomers of the type under discussion. Moreover, in the case of the thin layers having a multilayer structure, it is of course also possible for the individual monomolecular films to be formed from only one type of molecule or from several different types of molecules (metallomacrocyclic polymers which may or may not be mixed with the parent monomers).

The solid, thin, ordered layers of the novel layer elements are very homogeneous, surprisingly heat-stable, optically anisotropic and electrochemically active. The thickness of these layers can vary within wide limits, depending on the intended use and the desired property spectrum. In the case of the thin, ordered layers having a monolayer structure, the thickness of the layer is determined by the molecular dimensions and can be varied by the choice of the compounds forming the layer. In the thin, ordered layers having a multilayer structure, the thickness of the layers essentially depends on the number of monomolecular films arranged one on top of the other, this number being freely selectable and in principle not restricted. For example, novel layer elements have been produced whose solid, thin, ordered layers having a multilayer structure were built up from 120 or more monomolecular films. The novel layer elements may also contain color sheet and protective layers and/or intermediate layers between the base and the thin layers and/or the individual strata of thin multistratum layers.

The novel layer elements are stable to temperatures above 250° C. Only above this temperature do the solid, thin, ordered layers of the metallomacrocyclic polymers exhibit incipient decomposition with the loss of the special and advantageous layer properties. Surprisingly, it has been found that the properties of the novel layer elements can not only be stabilized but even improved if the novel layer elements are subjected to a heat treatment at elevated temperatures, for example at from 50° to 200° C., preferably from 100° to 150° C., directly after their production. By means of such a heat treatment, for example, the optical anisotropy of the novel layer elements can be increased by a factor of 2 or more.

The novel layer elements possessing the solid, thin, ordered layers of the metallomacrocyclic polymers can be produced by a conventional method. The LB method is particularly advantageous for this purpose. This metnod employs a water-filled Langmuir trough, i.e. a shallow trough, for example a rectangular one, which has a movable barrier on one side and a pressure transducer on the other. A certain amount of a solution of the metallomacrocyclic polymers or a solution of the metallomacrocyclic polymer/monomer mixture is applied to the water surface, and the solvent is evaporated with formation of a monolayer of the metallomacrocyclic polymers or of the metallomacrocyclic polymer/monomer mixture on the water. Thereafter, the surface area of the water is continuously reduced by means of the barrier, with the result that a lateral pressure is exerted on the monolayer on the water surface, and a solid-like monomolecular film is obtained. This solid-like monomolecular film of the metallomacrocyclic polymers, which may or may not be mixed with the parent monomers, in which the molecules are arranged in a type of two-dimensional mesophase and are oriented, is then transferred from the water surface to a substrate by immersing and withdrawing the latter. The procedure is usually carried out at about 0°–50° C. By repeated immersion and withdrawal, a multimolecular film can be formed on the substrate. To produce the novel layer elements, the substrate serving as the base is preferably immersed and withdrawn at right angles to the water surface, in order to transfer the monomolecular film produced on the water surface to the substrate. Where cylindrical substrates are used as bases, the monomolecular film can be transferred from the water surface to the substrate by means of the rotating cylinder method, in which the cylindrical substrate is allowed to rotate on the surface of the water.

As stated above, it may be advantageous if, directly after transfer of the monomolecular films from the water surface to the substrate, the novel layer element produced is heated at elevated temperatures, in general at from 50° to 200° C., preferably about 100°–150° C. Although this heating step should be carried out directly after production of the novel layer elements, storage for a certain time between production of the layer elements and heating of the latter is possible if the storage time is not excessively long, for example not more than a few hours. However, storage times of a few days between production of the layer elements and heating should be avoided. The heating process as such may last, for example, from a few minutes to a few hours, depending on the type and thickness of the novel layer elements. By means of the heating step following the production of the novel layer elements, the properties of the said elements can be stabilized or even selectively varied.

Because of their varied and advantageous properties, the novel layer elements have a wide range of uses. As a result of the absorption properties and the optical anisotropy of the solid, thin, ordered layers of the metallomacrocyclic polymers, novel layer elements having transparent bases can be used, for example, as optical filters, grey filters, polarization filters or interference filters. Such filters consisting of the novel layer elements are independent of temperature and can be used up to 250° C. Their properties depend on the type of the metallomacrocyclic polymers forming the solid, thin, ordered anisotropic layer, and on the thickness of this layer. For example, the extinction of the novel layer elements having a transparent base increases linearly with the thickness of the said layers. The magnitude of the optical anisotropy depends not only on the type of metallomacrocyclic polymers or metallomacrocyclic polymer/monomer mixtures used for producing the solid, thin, ordered layers, but of course also on the wavelength of the incident light. For example, an optical anisotropy, i.e. the ratio o the extinctions of light incident at right angles and parallel to the direction of molecular orientation in the solid, thin, ordered layers, of from 2 to 6 was measured on novel layer elements at a wavelength of 570 nm.

Since, owing to the polycyclic ring systems of the metallomacrocyclic polymers, the novel layer elements are electrochemically active, i.e. form defined redox states, the said layer elements may also advantageously be used in electrochemistry. For example, in order to produce sensor or catalyst effects, electrodes, e.g. platinum electrodes, can be coated with the solid, thin, ordered layers of the metallomacrocyclic polymers to obtain the layer elements according to the invention. This makes it possible, for example, to eliminate overvoltages at the platinum or to block certain potential ranges for the electrode. Owing to the defined redox states of the metallomacrocyclic polymers of the type under discussion, electrodes coated with these have windows, in which they are inactive, between the individual redox potentials of the polycyclic ring system of the metallomacrocyclic polymers. In the novel layer elements, the solid, thin, ordered layers of the metallomacrocyclic polymers generally have a specific electrical conductivity of about $10^{10}$ ohm$^{-1}$ cm$^{-1}$. If the semiconductor components are used as bases for the said layers of the novel layer elements, these layers are very useful as insulating layers for these semi-conductor components. On the other hand, the electrical conductivity of the said layers in the novel layer elements can be increased by a few powers of ten to the semiconducting range, e.g. from about $10^7$ to $10^2$ ohm$^{-1}$ cm$^{-1}$, by partial oxidation, for example by treatment with iodine vapor or by electrochemical oxidation. The said layers can thus also be used for the antistatic treatment of articles if they are applied, for example as a surface film, to plastic articles, such as windows, gramophone disks, electronic components etc., as bases. The novel layer elements may furthermore be used as photosensitive recording elements for electrophotography if an electrically conductive substrate is used as the base.

The Examples which follow illustrate the invention. Parts and percentages are by weight, unless stated otherwise.

EXAMPLE 1

(a) Preparation of trimethoxytetraoctoxyphthalocycaninatopolysiloxane [(CH3O)$_4$(C$_8$H$_{17}$O)$_4$PcSiO]$_n$ 7.6 g of CH$_3$O—C$_8$H$_{17}$O—1,3-diiminoisoindolinine in 100 ml of quinoline were heated to 50° C. under a nitrogen atmosphere. Silicon tetrachloride was added, after which the solution was heated at 160° C. for 30 minutes, cooled and then poured into 200 ml of a 1:2 water/methanol mixture. The tetramethoxytetraoctoxyphthalocyaninesilicon dichloride thus obtained was filtered off under suction, washed with methanol and dissolved in chloroform, the solution was filtered and the filtrate was finally evaporated down. The tetramethoxytetraoctoxyphthalocyaninesilicon dichloride was hydrolysed to the dihydroxide, which was then subjected to polycondensation to give the desired phthalocyaninatopolysiloxane. To do this, 1 g of the tetramethoxytetraoctoxyphthalocyaninesilicon dihydroxide and 50 mg of iron(III) chloride in toluene were refluxed for 7 days, while stirring. To check the conversion, samples were taken and absorption spectra in toluene were recorded. When the reaction was complete, the toluene was stripped off, the phthalocyaninatopolysiloxane was washed with water and methanol and dried at 50° C. under reduced pressure.

(b) Production of a layer element 100 ml of a solution of the phthalocyaninatopolysiloxane prepared under (a), in chloroform (about 1.6 mg of phthalocyaninatopolysiloxane per ml of chLoroform), were spread out on a water surface of about 60 cm$^2$ to form a monolayer, which was compressed to a surface pressure of 20 mN/m by means of a barrier. This lateral surface pressure was kept constant during transfer of the monolayer to the substrate. The substrate used for producing the layer element was a glass plate whose surface had been rendered hydrophobic beforehand by treatment with dimethylsilicon dichloride. The substrate was immersed at right angles and at a speed of 8 mm/minute into the water phase covered with the monolayer of the phthalocyaninatopolysiloxane and was withdrawn again. By repeating this process several times, 40 monolayers of the phthalocyaninatopolysiloxane were applied to each surface of the substrate, so that the glass plate was covered with a total of 80 monolayers.

The absorption spectra in the wavelength range from 500 to 800 nm was measured for the layer element produced under (b), using polarized light. In one case the polar axis was at right angles and in another parallel to the direction of immersion of the glass plate and hence to the orientation of the phthalocyaninatopolysiloxane molecules in the layers. Over the entire wavelength range, a substantially higher absorption was measured in the case of light incident at right angles than in the case of polarized light whose plane of polarization was parallel to the immersion direction. At the absorption maximum at 560 nm, the optical anisotropy (ratio of the extinctions of the layer element of the light incident at right angles and parallel, reduced by the intrinsic absorption of the glass) was 2.57.

EXAMPLE 2

As described in Example 1(b), multilayers were prepared on a glass base having a surface which had been rendered hydrophobic. In this case, however, the multilayers were prepared using mixtures of tetramethoxytetraoctoxyphthalocyaninatopolysiloxane and monomeric tetramethoxytetraoctoxyphthalocyaninesilicon dihydroxide in various ratios. The absorption spectra of the various layer elements were recorded in polarized light in the wavelength range from 500 to 800 nm, with the polar axis at right angles as well as parallel to the immersion direction of the glass base. The absorption maximum of the layer elements in this case had been shifted into the range from about 690 to 700 nm, i.e. toward the absorption maximum of the monomeric phthalocyaninesilicon dihydroxide. The layer elements exhibited pronounced anisotropy over the entire wavelength range. The optical anisotropy at 570 nm and 690 nm as a function of the polymer/monomer ratio in the mixture is shown in the Table below. The anisotropy value is the ratio of the optical densities of the layer elements for polarized light incident at right angles and parallel to the immersion direction of the glass base, the said optical densities being corrected to take into account the intrinsic absorption of the glass base which has been rendered hydrophobic.

TABLE

| Amount of polymer in the mixture | Optical anisotropy | |
|---|---|---|
| | at 570 nm | at 690 nm |
| 100% | 2.4 | 2.1 |
| 66% | 2.8 | 2.0 |
| 45% | 2.5 | 1.6 |
| 34% | 1.7 | 1.5 |

COMPARATIVE EXPERIMENT

The procedure described in Example 2 was followed, except that in this case the multilayers were prepared on the glass base using only the monomeric tetramethoxytetraoctoxyphthalocyaninesilicon dihydroxide, i.e. without a polymer. Although it was possible to transfer ordered layers from the water phase to the glass base, the resulting layer element was optically isotropic.

EXAMPLE 3

The procedure described in Example 1 was followed, except that in this case a layer element was produced which contained multilayers consisting of a total of 120 monolayers applied on the glass base. The layer element was heated to 140° C. immediately after its production and was kept at this temperature for about 1 hour. This heat treatment increased the optical anisotropy of the layer element (at 570 nm) from 2.48 to 5.82.

EXAMPLE 4

As described in Example 1(a), a tetramethoxytetradodecoxyphthalocyaninatopolysiloxane $[CH_3O)_4(C_{12}H_{25}O)_4PcSiO]_n$ was synthesized and was used to apply multilayers consisting of a total of 40 monolayers to a base consisting of quartz which had been rendered hydrophobic. The phthalocyaninatopolysiloxane layers had an electrical conductivity of about $10^{-10}$ ohm$^{-1}$ cm$^{-1}$. The multilayers of the layer element were then chemically oxidized by treatment with iodine in chloooform, after which excess iodine was distilled off azeotropically with chloroform. The layers treated in this manner had an electrical conductivity of from about $10^{-4}$ to $10^{-5}$ ohm$^{-1}$ cm$^{-1}$.

EXAMPLE 5

The procedure described in Example 1 was followed, except that in this case, instead of the glass plate, a platinum sheet was used as the base, onto which a multilayer consisting of a total of 40 monolayers was applied. This layer element was used as an electrode, and a cyclovoltammogram was recorded in acetonitrile as an electrolyte solvent. The electrode showed defined reduction and oxidation potentials. The first reduction potential was at $-1.5$ V (against Ag/AgCl); the first oxidation potential was at 0.7 V. Owing to the defined oxidation and reduction potentials of the multilayers of the phthalocyaninatopolysiloxane, no current flowed at a voltage in the range from 0 to $-1$ V, so that the platinum had been passivated in this potential window by the applied multilayer of the phthalocyaninatopolysiloxane.

We claim:

1. A layer element which comprises a base having a hydrophobic surface and, applied on the said base, one or more solid, thin, ordered layers having a defined uniform and regular structure with uniform orientation of the molecules in one direction and formed of a metallomacrocyclic polymer which is fusible and/or soluble in an organic water-immiscible solvent and is of the formula $[M(Pcyc)0]_n$, where M is Si, Ge or Sn, Pcyc is a complexforming centrosymmetric polycyclic ring system and n is the mean degree of polymerization and is equal to or greater than 3.

2. A layer element as defined in claim 1, wherein the solid, thin, ordered layer or layers contains or contain a mixture of the metallomacrocyclic polymers and monomeric metallomacrocyclic compounds of the formula $[M(Pcyc)X_2]$, where M is Si, Ge or Sn, Pcyc is a complex-forming centrosymmetric polycyclic ring system and X is a terminal group bonded to M.

3. A layer element as defined in claim 1, wherein the metallomacrocyclic polymer is a phthalocyaninatopolymetalloxane of the formula $[M(Pc)0]_n$, where M is Si, Ge or Sn, Pc is a phthalocyanine ring system having a hydrophobic substituent and n is the mean degree of polymerization and is equal to or greater than 3.

4. A layer element as defined in claim 3, wherein the solid, thin, ordered layer of the phthalocyaninatopolymetalloxanes also contains, mixed with these compounds, monomeric silicon, germanium or tin phthalocyaninatometalloxanes possessing hydrophobic substituents.

5. A layer element as defined in claim 1, wherein the solid, thin, ordered layers of the metallomacrocyclic polymers have a monolayer or multilayer structure.

6. A layer element as defined in claim 1, wherein the molecules of the metallomacrocyclic polymers in the solid, thin, ordered layers are oriented so that the polymer chains are parallel to one another and are in the plane of the layer.

7. A layer element as defined in claim 1, wherein the solid, thin, ordered layers of the metallomacrocyclic polymers have been heated at from 50° to 200° C. immediately after their production.

* * * * *